(12) United States Patent
Attard et al.

(10) Patent No.: US 10,088,844 B2
(45) Date of Patent: Oct. 2, 2018

(54) WEARABLE COMPUTER IN AN AUTONOMOUS VEHICLE

(71) Applicant: Ford Global Technologies, LLC, Dearborn, MI (US)

(72) Inventors: Christopher Attard, Ann Arbor, MI (US); Shane Elwart, Ypsilanti, MI (US); Jeff Allen Greenberg, Ann Arbor, MI (US); Rajit Johri, Ann Arbor, MI (US); John P. Joyce, West Bloomfield, MI (US); Devinder Singh Kochhar, Ann Arbor, MI (US); Thomas Edward Pilutti, Ann Arbor, MI (US); Douglas Scott Rhode, Farmington Hills, MI (US); Matt Y. Rupp, Canton, MI (US); John Shutko, Ann Arbor, MI (US); Roger Arnold Trombley, Ann Arbor, MI (US); Hongtei Eric Tseng, Canton, MI (US); Andrew Waldis, Orion Township, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 840 days.

(21) Appl. No.: 14/088,225

(22) Filed: Nov. 22, 2013

(65) Prior Publication Data

US 2015/0149018 A1    May 28, 2015

(51) Int. Cl.
*G05D 1/00* (2006.01)
*B60W 50/14* (2012.01)
*B60W 50/00* (2006.01)

(52) U.S. Cl.
CPC .......... *G05D 1/0061* (2013.01); *B60W 50/14* (2013.01); *B60W 2050/0064* (2013.01); *G05D 2201/0213* (2013.01)

(58) Field of Classification Search
CPC ............... G05D 1/00; G05D 1/0061; G05D 2201/0213; B60W 50/00–50/14; B60W 2050/0064
See application file for complete search history.

(56) References Cited

U.S. PATENT DOCUMENTS

| | | | | |
|---|---|---|---|---|
| 7,864,029 | B2 * | 1/2011 | Huang | B60R 25/04 340/426.1 |
| 7,868,770 | B2 * | 1/2011 | Al-Mutairi | G08B 21/06 340/439 |
| 8,036,842 | B2 * | 10/2011 | DeVaul | A61B 5/0024 702/79 |
| 8,952,869 | B1 * | 2/2015 | Weaver | G09G 5/00 345/8 |

(Continued)

FOREIGN PATENT DOCUMENTS

CN    103370249 A    10/2013

OTHER PUBLICATIONS

Notification of First Office Action issued by the State Intellectual Property Office (SIPO) of the People's Republic of China dated Jun. 12, 2018 regarding Application No. 201410680467.5 (Original with English translation) (37 pages).

*Primary Examiner* — Courtney D Heinle
(74) *Attorney, Agent, or Firm* — Frank A. MacKenzie; Beijing Bieneman PLC

(57) ABSTRACT

A wearable computing device in a vehicle is identified by a computer in a vehicle. Collected data is received relating to autonomous operation of the vehicle. A message is sent to the wearable computing device based at least in part on the collected data.

20 Claims, 2 Drawing Sheets

(56) References Cited

U.S. PATENT DOCUMENTS

| | | | |
|---|---|---|---|
| 2007/0135061 A1* | 6/2007 | Buck | H04M 1/6083 455/73 |
| 2008/0245598 A1* | 10/2008 | Gratz | B60R 25/1004 180/287 |
| 2009/0037104 A1* | 2/2009 | Basson | G01C 21/20 701/431 |
| 2010/0308999 A1* | 12/2010 | Chornenky | G08B 6/00 340/573.1 |
| 2012/0083960 A1* | 4/2012 | Zhu | G05D 1/0214 701/23 |
| 2012/0212406 A1* | 8/2012 | Osterhout | G02B 27/017 345/156 |
| 2013/0141576 A1* | 6/2013 | Lord | G08G 1/04 348/148 |
| 2014/0058587 A1* | 2/2014 | Leinfelder | G05D 1/0011 701/2 |
| 2014/0058613 A1* | 2/2014 | Leinfelder | B62D 15/028 701/28 |
| 2014/0088814 A1* | 3/2014 | You | G05D 1/0061 701/23 |
| 2014/0297067 A1* | 10/2014 | Malay | G01C 9/005 701/4 |
| 2014/0309789 A1* | 10/2014 | Ricci | B60Q 1/00 700/276 |
| 2014/0309806 A1* | 10/2014 | Ricci | B60Q 1/00 701/1 |
| 2015/0066284 A1* | 3/2015 | Yopp | B60W 30/00 701/29.2 |
| 2015/0081169 A1* | 3/2015 | Pisz | B60H 1/00657 701/36 |
| 2015/0100179 A1* | 4/2015 | Alaniz | A63F 13/00 701/1 |
| 2015/0127215 A1* | 5/2015 | Chatterjee | H04W 4/001 701/36 |
| 2015/0142244 A1* | 5/2015 | You | G05D 1/0061 701/23 |
| 2015/0217763 A1* | 8/2015 | Reichel | B60W 50/0098 701/23 |
| 2015/0321606 A1* | 11/2015 | Vartanian | B60R 1/00 348/148 |
| 2016/0125735 A1* | 5/2016 | Tuukkanen | G08G 1/09 701/23 |
| 2016/0159368 A1* | 6/2016 | Tuukkanen | B60W 50/08 701/24 |
| 2017/0219364 A1* | 8/2017 | Lathrop | G01C 21/3438 |
| 2017/0248968 A1* | 8/2017 | Malay | G05D 1/101 |

* cited by examiner

WEARABLE COMPUTER IN AN AUTONOMOUS VEHICLE

BACKGROUND

An autonomous vehicle, e.g., an automobile, bus, truck, watercraft, etc., may include a computing device executing instructions for operating the vehicle either wholly or partially autonomously, i.e., without input, or with partial input, from a human operator. For example, the vehicle computing device may receive data from one or more sensors, and then process sensor data to provide input to the computing device for determining autonomous operations of the vehicle, e.g., to control navigation, speed, braking, etc. Vehicle occupants may not need to pay attention to vehicle operations, e.g., driving a car, and may not even need to sit in a seat normally reserved for an operator, e.g., a driver, of the vehicle. However, it may be desirable or necessary at times for a computing device operating in autonomous vehicle to alert a vehicle occupant concerning various conditions, dangers, etc.

DRAWINGS

DESCRIPTION

Introduction

Figure 1:
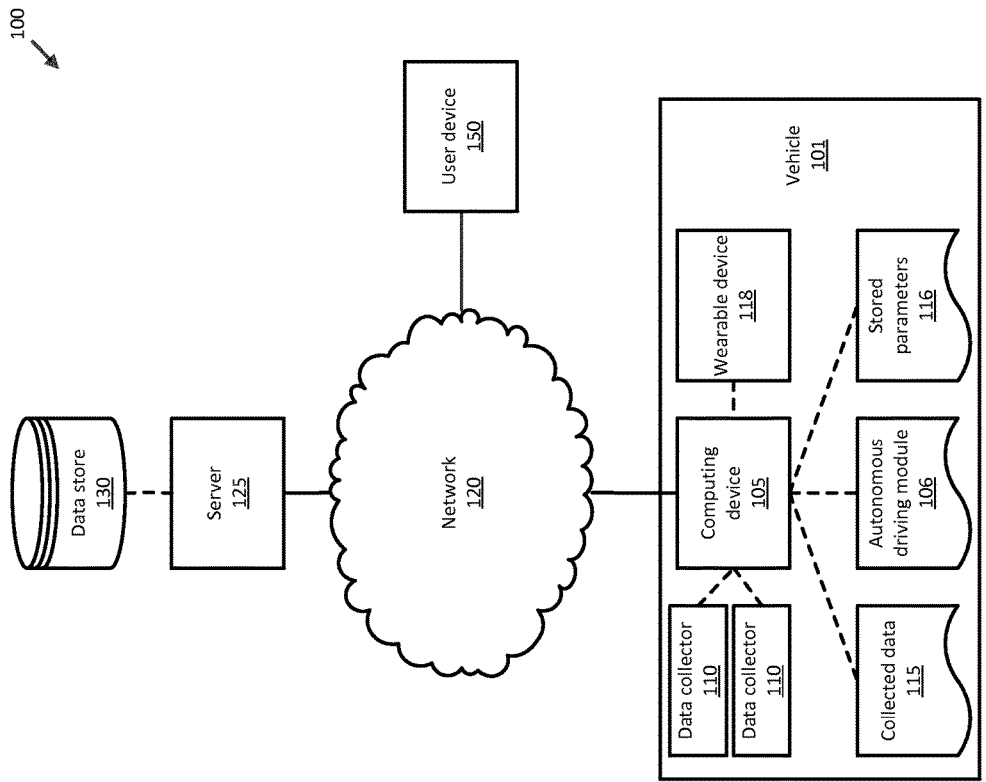
FIG. 1 is a block diagram of an exemplary vehicle system for operating an autonomous vehicle.

FIG. 1 is a block diagram of an exemplary vehicle system for operating an autonomous vehicle 101. Via a wearable computing device 118 in the vehicle 101, a central computing device 105 in the vehicle 101 may provide messages including alerts, informational messages, requests for input, and the like to a vehicle 101 occupant. The wearable computing device 118 may provide such messages in a variety of formats, including visual, auditory, and haptic messages, thereby providing a mechanism for obtaining vehicle 101 occupant attention when the vehicle 101 is being operated in whole or in part by an autonomous driving module 106, and the occupant may not be paying attention to vehicle 101 operations, monitoring vehicle 101 controls, etc. Further, the wearable device 118 may be used to provide inputs to the computer 105, including biometric data and the like concerning a user of the wearable device 118 as well as input specified by the device 118 user, e.g., responses to messages, alerts, etc.

Exemplary System Elements

The system 100 includes one or more vehicles 101, a single vehicle 101 being shown for ease of illustration. A vehicle 101 includes a vehicle computer 105 that generally includes a processor and a memory, the memory including one or more forms of computer-readable media, and storing instructions executable by the processor for performing various operations, including as disclosed herein. For example, the computer 105 generally includes, and is capable of executing, instructions to select and carry out an autonomous operation mode of the vehicle 101, e.g., as described herein with respect to the module 106.

Further, the computer 105 may include more than one computing device, e.g., controllers or the like included in the vehicle 101 for monitoring and/or controlling various vehicle components, e.g., an engine control unit (ECU), transmission control unit (TCU), etc. The computer 105 is generally configured for communications on a controller area network (CAN) bus or the like. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, the CAN bus or the like may be used for communications between devices represented as the computer 105 in this disclosure.

As mentioned above, generally included in instructions stored in and executed by the computer 105 is an autonomous driving module 106; alternatively or additionally, the vehicle 101 could include one or more other computing devices storing and executing the module 106. Using data received in the computer 105, e.g., from data collectors 110, data included as stored parameters 116, the server 125, etc., the module 106 may control various vehicle 101 components and/or operations without a driver to operate the vehicle 101. For example, the module 106 may be used to regulate vehicle 101 speed, acceleration, deceleration, steering, etc.

Data collectors 110 may include a variety of devices such as sensors and the like for collecting data 115. For example, various controllers in a vehicle may operate as data collectors 110 to provide collected data 115 via the CAN bus, e.g., data 115 relating to vehicle speed, acceleration, etc. Further, sensors or the like, global positioning system (GPS) equipment, etc., could be included in a vehicle and configured as data collectors 110 to provide data directly to the computer 105, e.g., via a wired or wireless connection. Data collectors 110 could also include sensors or the like for detecting conditions outside the vehicle 101, e.g., medium-range and long-range sensors. For example, sensor data collectors 110 could include mechanisms such as RADAR, LIDAR, sonar, cameras or other image capture devices, that could be deployed to measure a distance between the vehicle 101 and other vehicles or objects, to detect other vehicles or objects, and/or to detect road conditions, such as curves, potholes, dips, bumps, changes in grade, etc.

A memory of the computer 105 generally stores collected data 115. As mentioned above, collected data 115 may include a variety of data collected in a vehicle 101 from data collectors 110 and/or data calculated therefrom in the computer 105.

In general, collected data 115 may include any data that may be gathered by a collection device 110 and/or computed from such data. Accordingly, collected data 115 could include a variety of data related to vehicle 101 operations and/or performance, as well as data related to in particular relating to motion of the vehicle 101. For example, collected data 115 could include data 115 concerning a vehicle 101 speed, acceleration, braking, lane changes and or lane usage (e.g., on particular roads and/or types of roads such as interstate highways), average distances from other vehicles at respective speeds or ranges of speeds, and/or other data 115 relating to a vehicle 101 operation.

A memory of the computer 105 may further store one or more parameters 116 used to determine when the computer 105 should provide a message to a wearable device 118 in the vehicle 101, contents of such message, a form of such message, etc. Parameters 116 may be selected at least in part based on an identity of a user of a wearable device 118. For example, messages provided to a vehicle 101 occupant may differ, or be provided under different conditions, according to an occupant age, level of driving experience, health condition, etc. Accordingly, the device 118 could detect user attributes such as age, health conditions, etc. and/or could use known biometric mechanisms to identify a user and/or a user could provide identifying information, e.g., a user identifier such as a username, to the computer 105, e.g., via the device 118. Further, parameters 116 could be stored in the data store 130 and retrieved from the server 125 via the network 120, e.g., when a computer 105 registers a wearable device 118 associated with a particular individual user, i.e., occupant of the vehicle 101.

Exemplary parameters 116 include values such as thresholds, Boolean values, etc., to which various collected data 115 may be compared in the computer 105 to determine when to send a message to a wearable device 118, a content of such message, etc. As mentioned above, collected data 115 could include a variety of information relating to environmental conditions, such as a visibility distance, an amount of precipitation, road friction, e.g., as affected by weather conditions, speed of surrounding traffic, unexpected road or route conditions, e.g., lane closures, rough pavement, construction, detours, etc. One or more parameters 116 may relate to each of these types of collected data 115.

For example, a parameter 116 could specify a visibility distance threshold such that when collected data 115 indicated that data collectors 110 detected a visibility not meeting or exceeding the threshold, a message should be provided to a wearable device 118. For another example, a parameter 116 could specify a Boolean value relating to an unexpected road condition, e.g., "not true." When collected data 115 indicated an unexpected road condition value of "true," the computer 105 could be configured to provide a message to a wearable device 118. For yet another example, a parameter 116 could specify a threshold value related to road friction. When collected data 115, e.g., obtained from a vehicle 101 braking system, indicated that road friction met or had fallen below the threshold value, a message could be provided to the wearable device 118.

A wearable computing device 118 could be any one of a number of computing devices that may be worn by or attached to a user, e.g., the wearable device 118 could be in the form of glasses, goggles, a wristband, and ankle band, etc. Further, the device 118 is generally configured for communication with the computer 105 via known wired or wireless mechanisms, e.g., the Bluetooth protocol, IEEE 802.11, or the like. The wearable device 118 may include a variety of user interface mechanisms, including a graphical display provided on glasses, goggles, a wrist device, etc., audio mechanisms, haptic mechanisms, e.g., that vibrate against a user's body, etc. Accordingly, the device 118 may provide messages via one or more such user interface mechanisms and/or may receive user input for the computer 105 via one or more of such mechanisms including speech, etc.

In addition, user interface mechanisms of the wearable computer 118 may include sensors or the like for obtaining biometric data. For example, biometric data may relate to pulse rate, respiration, body temperature, fingerprint patterns, retinal patterns, etc. Mechanisms for collecting such biometric data, and for using biometric data to make determinations regarding a user's age, gender, general health conditions, etc. are known. Accordingly, the wearable computer 118 may obtain biometric data to identify a user and/or for the computer 105 to authenticate and/or identify the user. As mentioned above, based on an identification of a user and/or user attributes, e.g., age, health conditions, etc., the computer 105 may select appropriate parameters 116, e.g., determine that a vehicle 101 occupant wearing a device 118 is a vehicle 101 owner or other individual authorized to operate the vehicle 101, that the occupant is legally licensed for vehicle 101 operations, including autonomous operations, that the vehicle 101 occupant is physically fit to operate the vehicle 101 and/or monitor autonomous vehicle 101 operations, etc. Further, a wearable computing device 118 could use biometric data to determine when the device 118 had been transferred from a first user to a second user; upon such transfer being detected, the computer 105 could be configured to change parameters 116, to cease or alter autonomous operation of the vehicle 101, etc.

The network 120 represents one or more mechanisms by which a vehicle computer 105 may communicate with a remote server 125 and/or a user device 150. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115 and/or parameters 116. For example, one or more parameters 116 for a particular user could be stored in the server 125 and retrieved by the computer 105 when the user was in a particular vehicle 101. Likewise, the server 125 could, as mentioned above, provide data to the computer 105 for use in determining parameters 116, e.g., data concerning weather conditions, road conditions, construction zones, etc.

A user device 150 may be any one of a variety of computing devices including a processor and a memory, as well as communication capabilities. For example, the user device 150 may be a portable computer, tablet computer, a smart phone, etc. that includes capabilities for wireless communications using IEEE 802.11, Bluetooth, and/or cellular communications protocols. Further, the user device 150 may use such communication capabilities to communicate via the network 120 including with a vehicle computer 105. A user device 150 could communicate with a vehicle 101 computer 105 via other mechanisms such as a network in the vehicle 101, a known protocol such as Bluetooth, etc. Accordingly, a user device 150 may be used to carry out certain operations herein ascribed to a data collector 110, e.g., voice recognition functions, cameras, global positioning system (GPS) functions, etc., and a user device 150 could be used to provide data 115 to the computer 105. Further, a user device 150 could be used to provide a human machine interface (HMI) to the computer 105.

Exemplary Process Flows

Figure 2:
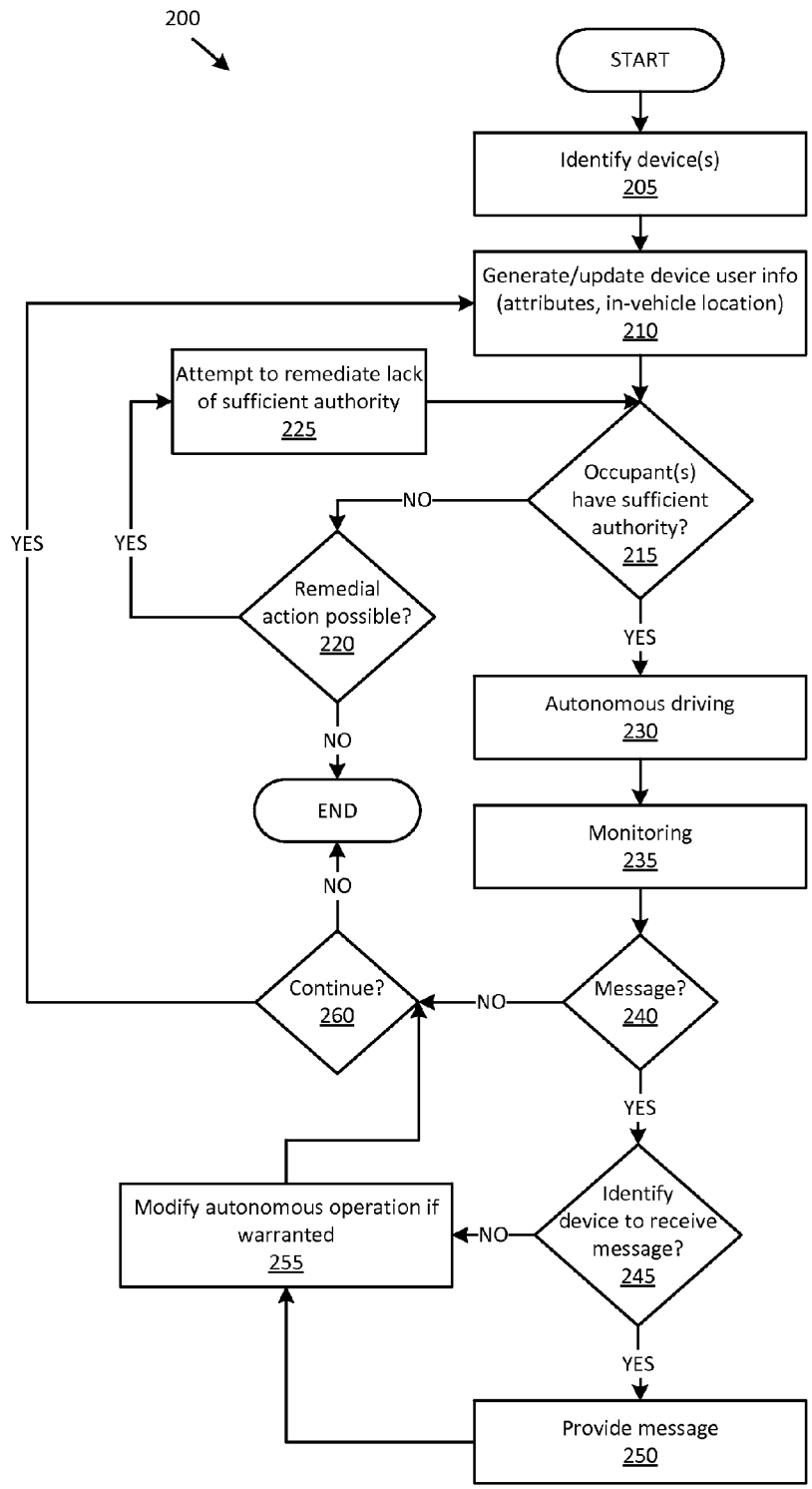
FIG. 2 is a diagram of an exemplary process for a computer in an autonomous vehicle to communicate with one or more vehicle occupants via a wearable computing device.

FIG. 2 is a diagram of an exemplary process 200 for a computer 105 in an autonomous vehicle 101 to communicate with one or more vehicle occupants via a wearable computing device 118.

The process 200 begins in a block 205, in which the computer 105 identifies one or more wearable devices 118 in a vehicle 101. For example, a user may enter a vehicle 101 with a wearable device 118 and provide input to the vehicle 101, e.g., via a key, electronic fob, etc., that vehicle 101 operations, including autonomous operations, are to be commenced. Upon startup and/or receiving such input, the computer 105 may be configured to attempt to detect one or more wearable devices 118, e.g., by attempting Bluetooth pairings, by broadcasting via a wireless local area network, etc. It is to be understood that, although not shown in FIG. 2, if no devices 118 can be detected, then the process 200 cannot be carried out, i.e., will end.

Next, in a block 210, the computer 105 generates, or, after a first iteration of the process 200, may update, values of various attributes relating to each wearable device 118 detected in the block 205. For example, for each wearable device 118, the computer 105 may store an identifier for a user of the device 118, e.g., provided according to user input, biometric data, etc., as described above. Further, the computer 105 may store other user/device 118 attributes, e.g., such as a location of a user in the vehicle 101 that may be provided by user input, a user age, a user health condition (e.g., body temperature, heart rate, respiration rate, etc., or a health condition detected from such data, such as asthma, potential heart condition, flu symptoms, etc.). Concerning a user location in a vehicle 101, various known methods could be used for making this determination, e.g., proximity detection based on WiFi or Bluetooth signal strength; Near Field Communication (NFC); video identification via face recognition using an interior camera data collector 110; video identification using an infrared (IR) pulse code emitted by a wearable device 118 and received by an interior camera data collector 110.

Additionally, once a user of the wearable device 118 is identified and/or based on biometric data, the computer 105 may store for the user, e.g., according to a user identifier, attributes relating to the user's authorization to operate the vehicle 101, e.g., manually, autonomously, only during daytime, only when no precipitation is present, only on roads having a speed limit below a predetermined threshold, not at all, range or distance restrictions (e.g. minors might be restricted to a predefined set of boundaries, limited by a so-called geo-fence, or limited to traveling a certain distance from a home base), etc.

Yet further, some or all of the authorization of the block 210 could be performed by sending a query from the computer 105 to the server 125, which could return information retrieved from the data store 130 based on an identification of a vehicle 101 occupant. The data store 130 could store information related to an occupant of a vehicle 101, including, for example, an occupant's age, medical condition or vision limitations, and/or specific restrictions such as mentioned in the previous paragraph.

Next, in a block 215, the computer 105 determines whether at least one wearable device 118 in the vehicle 101 is being worn by an occupant having sufficient authority for vehicle 101 operations, e.g., using mechanisms for authentication and authorization such as discussed above.

If multiple wearable devices 118 are present in the vehicle 101 and are associated with occupants having sufficient authority for vehicle 101 operations, the computer 105 may include instructions for determining whether messages and the like should be provided to a single one of the devices 118, and if so, identifying the device 118, e.g., according to user input, according to predetermined rules of priority, e.g., a particular user may always have top priority, etc. Further, if messages and the like should be provided to multiple devices 118, the computer 105 may likewise include instructions for determining a priority of the messages, e.g., to send a message to a first device 118, and then, if no response is provided, to send a message to a second device 118 having a next level of priority. Additionally, the computer 105 could be configured to send messages to multiple devices 118 at the same time.

In any event, if at least one occupant has sufficient authority for vehicle 101 operations, including autonomous operations, then a block 230 is executed next. Otherwise, the process 200 proceeds to a block 220.

In the block 220, the computer 105 having determined that no occupant of the vehicle 101 has sufficient authority for vehicle 101 operations, the computer 105 determines whether a remedial action is possible. For example, a wearer of a device 118 could be authorized for vehicle 101 operations, but only when sitting in a particular location in the vehicle 101, e.g., a "driver's seat." Accordingly, that vehicle 101 occupant could remedy the lack of authority to operate the vehicle 101 by moving to an appropriate location. If remedial action is determined to be possible, then the process 200 proceeds to a block 225. Otherwise, the process 200 ends.

In the block 225, the computer 105 attempts to remediate the lack of sufficient authority detected as described with respect to the block 215. For example, the computer 105 may provide a message, e.g., an audio, textual, etc., message, via the wearable device 118, via a human machine interface (HMI) of the computer 105, etc., suggesting that a user of a wearable device 118 moved to an appropriate location in the vehicle 101. Following the block 225, the process 200 returns to the block 215.

In the block 230, which may follow the block 215, the vehicle 101 conducts autonomous driving operations. Thus, the vehicle 101 is operated partially or completely autonomously, i.e., a manner partially or completely controlled by the autonomous driving module 106. For example, all vehicle 101 operations, e.g., steering, braking, speed, etc., could be controlled by the module 106 in the computer 105. It is also possible that the vehicle 101 may be operated in a partially autonomous (i.e., partially manual, fashion, where some operations, e.g., braking, could be manually controlled by a driver, while other operations, e.g., including steering, could be controlled by the computer 105. Likewise, the module 106 could control when a vehicle 101 changes lanes. Further, it is possible that the process 200 could be commenced at some point after vehicle 101 driving operations begin, e.g., when manually initiated by a vehicle occupant through a user interface of the computer 105.

Next, in a block 235, the computer 105 gathers collected data 115. As mentioned above, collected data 115 may include a variety of sensed information, e.g., camera images, data from radar, lidar, etc. sensors, accelerometer data, geo-coordinates, etc. Further, collected data 115 may be derived from such sensed information, e.g., if geo-coordinates of the vehicle 101 deviate from geo-coordinates of a planned route, a Boolean collected datum 115 relating to whether the vehicle 101 is on course may be set to "not true."

Next, in a block 240, the computer 105 determines whether to send a message to one or more wearable devices 118 in the vehicle 101. For example, the computer 105 could determine that an alert condition exists, e.g., because a vehicle is off course, because environmental conditions, e.g., precipitation, visibility, road friction, etc., may require a driver's manual control of the vehicle 101, etc. Alternatively or additionally, the computer 105 could determine that an informational message should be provided, e.g., a message stating that the vehicle 101 was nearing a planned destination, e.g., because a comparison of geo-coordinates of the present location to geo-coordinates of a planned destination stored in a parameter 116 indicates a vehicle 101 proximity to the planned destination within a predetermined threshold distance and/or time of arrival. In any event, if the computer 105 determines whether to send a message to one or more wearable devices 118, then a block 245 is executed next. Otherwise, the process 200 proceeds to a block 260.

In the block 245, which may follow the block 240, the computer 105 determines whether at least one device 118 can be identified to receive a message determined in the block 240. For example, as mentioned above, the computer 105 may include instructions for assigning a priority to devices 118 for receiving messages when more than one device 118 is present in the vehicle 101. Moreover, the computer 105 may include instructions to determine whether a device 118 should receive a particular message. For example, if a wearer of a device 118 is not authorized to manually operate a vehicle 101, then a message telling the device 118 wearer to take manual control of the vehicle 101 would not be appropriate. Thus, if no device 118 is present in the vehicle 101 that should receive the message of the block 240, then the process 200 proceeds to the block 255. Otherwise, the process 200 proceeds to a block 250.

In a block 250, the computer 105 provides a message, e.g., as described above with respect to the block 240, to one or more wearable devices 118. As noted above, such message may take a variety of forms. For example, a message to a wearable device 118 may be provided from the computer 105 in conjunction with a display on an HMI, e.g., a graphical user interface, of the computer 105. In such example, a vehicle 101 occupant could be located in a seat other than an operator's seat, could be engaged in consuming media such as a video presentation and/or engaged with other vehicle occupants. Accordingly, a message to a wearable device 118 could include haptic output, e.g., vibrations of the device 118, to obtain attention of the device 118 wearer.

Alternatively or additionally, a message to a device 118 could be provided in a visual or audio format, e.g., providing specific information such as "route deviation," "caution: slippery roads; consider taking manual control," "road construction ahead; manual control required in two minutes," etc. Yet further alternatively or additionally, such information, alerts, etc. could be provided via an HMI of the computer 105 in conjunction with a haptic message or the like to the device 118 as just mentioned.

Moreover, the computer 105 could provide repeated messages to a device 118 until a response was received. For example, a message could begin with a relatively low level of haptic output, e.g., a quick and/or not very severe vibration, and then, if a response was not received, the message could be provided with successively greater levels of haptic output until a response was received from the device 118.

Alternatively or additionally, a message requiring a response could be provided with a "timeout" period or the like. That is, the computer 105 could include instructions for waiting a predetermined period of time, e.g., 20 seconds, 30 seconds, etc., to receive a response from a device 118 to a message. If no response was received within the specified predetermined period of time, the computer 105 could include instructions for taking appropriate action. For example, if the message informed a device 118 wearer of a need to take manual control of the vehicle 101, and the device 118 did not respond to the message, the computer 105 could include instructions for maneuvering the vehicle 101 off or to the side of a road and ceasing autonomous operations.

In the block 255, which may follow either of the blocks 245, 250, the computer 105, e.g., according to instructions included in the module 106, determines whether to modify, including whether to cease, autonomous operations of the vehicle 101. For example, a message as determined in the block 240 may relate to a safety condition, e.g., slippery roads, poor visibility, etc. Alternatively or additionally, the computer 105 may have determined in the block 245 that no occupant of the vehicle 101 is authorized to manually operate the vehicle 101 under determined conditions. Yet further, the computer 105 may have failed to receive a response to a message to a device 118 as described above, or the computer 105 may have received a response to a message to a device 118 specifying an action to be taken related to autonomous operations of the vehicle 101. For example, a response to message to a device 118 could specify that autonomous operations should cease and that a vehicle 101 occupant will take manual control, whereupon the computer 105 could include instructions to end all autonomous vehicle 101 operations, e.g., all operations conducted by the autonomous driving module 106.

Accordingly, in the block 255, the computer 105 may implement a variety of modifications of autonomous vehicle 101 operations. For example, the computer 105 could cause the vehicle 101 to follow a "safe harbor" procedure in which the vehicle 101 slows and pulls to a safe location off or at the side of a road. For another example, the computer 105 could cause a change in speed, e.g. slow a speed, of the vehicle 101. In yet another example, the computer 105 could determine that no changes to autonomous vehicle 101 operations are needed, e.g., because a vehicle 101 occupant with proper authorization for present conditions is present in the vehicle 101. In yet another example, as mentioned above, the computer 105 could implement an action as determined by a response from a wearable device 118 to a message from the computer 105.

Following either the block 240 or the block 255, the computer 105 determines in a block 260 whether the process 200 should continue. For example, the process 200 may end if autonomous driving operations end and a driver resumes manual control, if the vehicle 101 is powered off, etc. In any case, if the process 200 should not continue, the process 200 ends following the block 260. Otherwise, the process 200 returns to the block 210.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer in a vehicle, the computer comprising a processor and a memory, and configured to:
   identify a wearable computing device in the vehicle;
   receive data collected from a vehicle network during autonomous operation of the vehicle; and
   send a message to the wearable computing device during the autonomous operation based at least in part on the collected data; and
   receive a response to the message from the wearable device.

2. The system of claim 1, wherein attribute data associated with the wearable device includes at least one of a user identity, a user age, and a user health condition.

3. The system of claim 1, wherein the collected data includes at least one of data relating to a road condition, a weather condition, and a route of the vehicle.

4. The system of claim 1, wherein the message includes a haptic output.

5. The system of claim 1, wherein the computer is further configured to autonomously operate the vehicle.

6. The system of claim 1 wherein the computer is further configured to modify autonomous operation of the vehicle based at least in part on the response to the message from the wearable device.

7. The system of claim 1, wherein the vehicle includes at least one second wearable device in addition to the wearable device.

8. The system of claim 1, wherein the computer is further configured to:
   store attribute data related to the wearable computing device; and
   determine, based at least in part on the attribute data, that a wearer of the wearable device is authorized to operate the vehicle.

9. The system of claim 1, wherein the computer is further configured to:
   retrieve attribute data related to the wearable computing device from a remote server; and
   determine, based at least in part on the attribute data, that a wearer of the wearable device is authorized to operate the vehicle.

10. A method, comprising:
    identifying a wearable computing device in the vehicle;
    receiving data collected from a vehicle network during autonomous operation of the vehicle;
    sending a message to the wearable computing device during the autonomous operation based at least in part on the collected data; and
    receiving a response to the message from the wearable device.

11. The method of claim 10, wherein attribute data associated with the wearable device includes at least one of a user identity, a user age, and a user health condition.

12. The method of claim 10, wherein the collected data includes at least one of data relating to a road condition, a weather condition, and a route of the vehicle.

13. The method of claim 10, wherein the message includes a haptic output.

14. The method of claim 10, further comprising autonomously operating the vehicle.

15. The method of claim 10, further comprising modifying autonomous operation of the vehicle based at least in part on the response to the message from the wearable device.

16. The method of claim 10, wherein the vehicle includes at least one second wearable device in addition to the wearable device.

17. The method of claim 10, further comprising:
   storing attribute data related to the wearable computing device; and
   determining, based at least in part on the attribute data, that a wearer of the wearable device is authorized to operate the vehicle.

18. The method of claim 10, further comprising:
   retrieving attribute data related to the wearable computing device from a remote server; and
   determining, based at least in part on the attribute data, that a wearer of the wearable device is authorized to operate the vehicle.

19. A system, comprising:
   a wearable computing device;
   means for receiving data collected from a vehicle network during autonomous operation of the vehicle;
   means for sending a message to the wearable computing device during the autonomous operation based at least in part on the collected data; and
   means for receiving a response to the message from the wearable device.

20. The system of claim 19, further comprising means for modifying autonomous operation of the vehicle based at least in part on the response to the message from the wearable device.

* * * * *